(12) United States Patent
Mulder

(10) Patent No.: US 7,934,301 B2
(45) Date of Patent: *May 3, 2011

(54) METHOD OF MANUFACTURING EXPANDED METAL

(75) Inventor: Dominicus Fredericus Mulder, Amsterdam (NL)

(73) Assignee: Shell Oil Company, Houston, TX (US)

(*) Notice: Subject to any disclaimer, the term of this patent is extended or adjusted under 35 U.S.C. 154(b) by 329 days.

This patent is subject to a terminal disclaimer.

(21) Appl. No.: 11/866,941

(22) Filed: Oct. 3, 2007

(65) Prior Publication Data

US 2008/0078888 A1 Apr. 3, 2008

Related U.S. Application Data

(62) Division of application No. 10/913,929, filed on Aug. 6, 2004, now Pat. No. 7,389,811.

(30) Foreign Application Priority Data

Aug. 6, 2003 (EP) .................................. 03077463

(51) Int. Cl.
*B21D 31/04* (2006.01)
*F28D 7/00* (2006.01)
(52) U.S. Cl. ........ 29/6.1; 29/890.03; 165/162; 165/172; 72/379.2; 72/459; 72/478
(58) Field of Classification Search .................. 165/159, 165/162, 172, 178; 29/6.1, 890.03, 890.04, 29/890.043; 248/68.1; 72/393, 459, 472, 72/478, 379.2, 377
See application file for complete search history.

(56) References Cited

U.S. PATENT DOCUMENTS

| 1,231,888 | A | * | 7/1917 | Herr | 29/6.1 |
| 2,018,037 | A | | 10/1935 | Sieder | 257/239 |
| 3,206,536 | A | | 9/1965 | Goodloe | 174/35 |
| 3,399,719 | A | | 9/1968 | Forrest et al. | 165/47 |

(Continued)

FOREIGN PATENT DOCUMENTS

AU 74487/87 6/1986

(Continued)

OTHER PUBLICATIONS

*Perry's Chemical Engineers' Handbook*, 5th Edition, 1973, McGraw-Hill Inc., pp. 11-3-11/21.

Primary Examiner — Essama Omgba
(74) Attorney, Agent, or Firm — Charles W. Stewart

(57) ABSTRACT

A sheet of expanded metal produced by slitting a sheet of metal, and stretching along a stretching direction, which sheet of expanded metal forms a grid of openings having a first repetition length in the stretching direction and a second repetition length in the direction perpendicular to the stretching direction, wherein the first and second repetition lengths are substantially equal. A sheet of expanded metal having a stretching angle larger than 90 degrees. Use of a sheet of expanded metal according to the invention for supporting a bundle of parallel tubes. A method of manufacturing expanded metal from pre-expanded metal, wherein expansion force is applied at a plurality of points perpendicular to the stretching direction, wherein the expansion force is applied using a plurality of force transmitters co-operating with the plurality of points, and wherein the force transmitters are arranged so that they can move towards each other in the second direction while applying extension force.

5 Claims, 13 Drawing Sheets

U.S. PATENT DOCUMENTS

| | | | | |
|---|---|---|---|---|
| 3,607,411 | A | 9/1971 | Brownrigg | 136/37 |
| 3,853,626 | A | 12/1974 | Daniels, Jr. et al. | 136/36 |
| 3,867,200 | A | 2/1975 | Daniels, Jr. | 136/36 |
| 3,910,092 | A * | 10/1975 | Jury et al. | 72/302 |
| 3,913,193 | A | 10/1975 | Borello | 29/6.2 |
| 3,945,097 | A | 3/1976 | Daniels, Jr. et al. | 29/2 |
| 4,099,309 | A | 7/1978 | Bender | 29/2 |
| 4,143,709 | A | 3/1979 | Cunningham | 165/172 |
| 4,359,088 | A | 11/1982 | Jabsen | 165/172 |
| 4,426,343 | A | 1/1984 | Vittone et al. | 264/147 |
| 4,579,304 | A | 4/1986 | Williams | 248/68.1 |
| 4,596,129 | A | 6/1986 | Hamanaka et al. | 72/187 |
| 5,366,188 | A | 11/1994 | Kramer et al. | 248/68.1 |
| 5,762,654 | A | 6/1998 | Kump et al. | 29/623.5 |
| 6,059,022 | A * | 5/2000 | Wilson | 165/162 |
| 6,212,744 | B1 | 4/2001 | Inanobe et al. | 29/6.1 |
| 6,243,932 | B1 | 6/2001 | Kashio et al. | 29/2 |
| 6,629,016 | B1 | 9/2003 | Smith | 700/145 |
| 784,517 | A1 | 3/2005 | Curtis | |
| 7,284,598 | B2 * | 10/2007 | Mulder | 165/162 |
| 7,389,811 | B2 * | 6/2008 | Mulder | 165/162 |
| 2003/0173066 | A1 * | 9/2003 | Mulder | 165/157 |
| 2004/0263609 | A1 | 12/2004 | Otsuki et al. | 348/14.02 |

FOREIGN PATENT DOCUMENTS

| | | |
|---|---|---|
| AU | 31258/89 | 3/1988 |
| CA | 2474935 | 8/2003 |
| CA | 2534832 | 2/2005 |
| CN | 1849494 | 10/2006 |
| DE | 1601794 | 2/1971 |
| DE | 3136865 | 3/1983 |
| EP | 0027092 | 4/1981 |
| EP | 81013 | 11/1986 |
| EP | 445391 | 9/1991 |
| FR | 2393217 | 12/1978 |
| GB | 29485 | 2/1914 |
| GB | 1442106 | 8/1974 |
| WO | WO8502567 | 6/1985 |
| WO | WO03067170 | 8/2003 |

* cited by examiner

METHOD OF MANUFACTURING EXPANDED METAL

This application is a divisional of U.S. application Ser. No. 10/913,929, filed Aug. 6, 2004 granted as U.S. Pat. No. 7,389,811 on Jun. 24, 2008.

FIELD OF THE INVENTION

The present invention relates to a sheet of expanded metal, to a method of producing a sheet of expanded metal, and to the use of such expanded metal as support for a bundle of parallel tubes.

BACKGROUND OF THE INVENTION

A sheet of expanded metal is conventionally made from sheet metal that is slit according to an arrangement of staggered parallel dashed lines, and stretched (expanded) perpendicular to the dashed lines into a structure of cross laths with interstices. Its manufacture is generally cheap. Moreover the sheets can easily be cut to a desired shape for a particular application, e.g. circular, for example by laser cutting.

The sheet of expanded metal forms a regular grid of openings, wherein each opening is defined by two substantially V-shaped pairs of strands, wherein the strands of each pair are adjoined in the direction of stretching and define a stretching angle, and two bonds interconnecting the two pairs of strands at the ends of the V-shapes. The openings of expanded metal have substantially rhombical or frustro-rhombical shape. Substantially rhombical shape (the shape of an equilateral parallelogram) is obtained when the slits along a virtual dashed line are much longer than the non-slit parts (so-called bonds) between them. After stretching of the slit sheet metal, the bonds form corner points each connecting four so-called strands of equal length. If the non-slit parts between the slits are relatively long, than a substantially frustro-rhombical shape is obtained. By frustro-rhombical it is meant that two opposite corners of a rhombical shape are cut off along a pair of parallel lines.

The strands after stretching of expanded metal are not perfectly straight but often slightly S-shaped; i.e. curved at the connections with the bonds, with a substantially linear central part in between. It will be understood that the V-shape of pairs of adjacent (neighboured) strands in the direction of stretching is somewhat distorted. The stretching angle is suitably defined by the central parts of the strands forming the (distorted) V-shape.

Known expanded metal is stretched to a maximum of 90 degrees, resulting in approximately square openings, as can for example be obtained from Sorst Streckmetall GmbH, Hannover, Germany.

Also, when expanded metal is stretched out, the strands are twisted out of the plane of the sheet metal, unless the sheet is subsequently flattened again. The slight S-shape of the strands and their attachment to the bonds has the consequence that the openings have no more than two mirror symmetry axes, which can be along and perpendicular to the direction of the stretching. This will be discussed in more detail with reference to the drawings.

To account for deviations of the openings in expanded metal from a perfect rhombical or frustro-rhombical shape are, the term 'substantially rhombical or frustro-rhombical shape' is used hereafter. The term therefore encompasses perfect and imperfect or distorted such shapes.

International Patent Application No. PCT/EP03/01074 in the name of Applicant, which was unpublished at the priority date of the present application, relates to the use of expanded metal as support for a bundle of tubes, such as a support baffle in a heat exchanger, in particular a shell-and-tube heat exchanger.

A shell-and-tube heat exchanger normally comprises a cylindrical vessel in which a bundle of parallel tubes are arranged extending in longitudinal direction of the vessel. It is an indirect heat exchanger in which heat is transferred between a fluid passing through the tubes of the tube bundle (the tube side) and a fluid passing through the space outside the tubes (the shell side). Details of the shell-and-tube heat exchangers can for example be found in Perry's Chemical Engineers' Handbook, $6^{th}$ edition, 1984, McGraw-Hill Inc., page 11-3 to 11-21. The ends of the tubes of the tube bundle are secured to a tube sheet. The heat exchanger can include two tube sheets, one at each end of the cylindrical vessel, or a single tube sheet at one end of the cylindrical vessel in the event the heat exchanger is a U-tube exchanger.

The intermediate portions of the tubes have to be supported as well, for example to prevent damage to the tubes due to vibrations caused by the fluid flow. To support the intermediate portions of the tubes, a support can be used including transverse support plates that are spaced apart along the length of the tubes.

A conventional support comprises segmental baffles, and there are several kinds discussed in Perry's. Baffles do not only support the tubes, but also influence the fluid flow through the shell side. Therefore the design of a baffle is as well determined by heat-transfer considerations.

U.S. Pat. No. 4,143,709 discloses a support for a bundle of parallel tubes, which support comprises a plurality of transverse support plates spaced apart along the length direction of the tubes to be supported. Each plate is integrally formed from a single sheet wherein a plurality of holes is cut on a regular grid, each of which holes is large enough to accept a plurality of tubes. The holes can be generally rectangular-shaped, generally square-shaped, generally triangular-shaped or generally rhombical (diamond-shaped).

At least one of the support plates of the known support is disposed out of phase or staggered. Tubes extending through the same hole in one support plate extend through different holes in another support plate, so that the cooperating adjacent plates support the tubes from opposite sides against lateral movement.

However, applicant has found that the deviations from perfect rhombical or frustro-rhombical shape make it difficult to use expanded metal in a staggered arrangement like in U.S. Pat. No. 4,143,709, since at least two different types of passageways are formed with slightly different cross-section and shape, which is undesirable for optimum tube support.

It is an object of the invention to provide a new sheet of expanded metal, in particular expanded metal with optimum properties for use as a tube support.

It is a further object to provide a new method for manufacturing expanded metal.

SUMMARY OF THE INVENTION

According to the present invention there is provided a sheet of expanded metal produced by slitting a sheet of metal, and stretching along a stretching direction, which sheet of expanded metal forms a grid of openings having a first repetition length in the stretching direction and a second repetition length in the direction perpendicular to the stretching direction, wherein the first and second repetition lengths are substantially equal.

The term repetition length is used to refer to the distance (unit length) that the grid needs to be translated (along a selected direction) in order that the openings of the translated grid overlay the openings of the non-translated grid.

The equal repetition lengths in the perpendicular directions allow to arrange two sheets of expanded metal one behind the other, and with their stretching directions at 90 degrees with respect to each other, so that the grids still match and parallel passages are obtained that have uniform cross-sections for tubes to pass through.

The term substantially equal is used in the sense that deviation between repetition lengths is 2% or less, preferably 0.5% (equivalent to 5 mm/m) or less, more preferably the deviation is 0.2% (2 mm/m) or less.

The stretching angle for such a sheet of expanded metal is suitably 90 degrees or more. The stretching angle needed to provide the same repetition length in both directions depends inter alia on the ratio of bond length to strand length, wherein higher ratios require larger stretching angles. One suitable configuration of openings is obtained when the bond length is minimized so that nearly square openings are obtained. Another suitable configuration is obtained with a stretching angle of approximately 120 degrees. Expanded metal having a stretching angle larger than 90 degrees will also be referred to as overstretched expanded metal in the description and in the claims. The invention also relates to a sheet of expanded metal having a stretching angle greater than 90 degrees.

It is observed that known expanded metal with square openings does not have equal repetition lengths along the stretching and perpendicular directions, due to the fact that their bonds are longer than their width in the stretching direction.

The invention further relates to the use of a sheet of expanded metal according to the invention for supporting a bundle of parallel tubes.

Moreover there is provided a method of manufacturing expanded metal forming a grid of openings and having a first repetition length in a first direction and a second repetition length in a second direction perpendicular to the first direction, such that the first and second repetition lengths have a predetermined ratio, which method comprises the steps of providing pre-expanded metal having a stretching direction coinciding with the first direction, and forming a grid having a ratio of first and second repetition lengths that is smaller than the predetermined ratio;

applying expansion force along the first direction, at a plurality of points at various positions with respect to the second direction, until the predetermined ratio of repetition lengths is obtained, wherein the expansion force is applied using a plurality of force transmitters co-operating with the plurality of points, and wherein the force transmitters are arranged so that they can move towards each other in the second direction while applying extension force.

The method of manufacturing according to the invention allows to provide expanded metal even at large stretching angles such as above 85 degrees, in particular 90 degrees, and higher. The sheet of metal is expanded in two steps. The first step can be a conventional expansion of sheet metal resulting in pre-expanded metal, which can for example be purchased from stock.

The pre-expanded metal does not have the desired ratio of repetition lengths. In order to expand the metal further so that the desired ratio is achieved, expansion force is applied at a plurality of points distributed perpendicular to the stretching direction over the grid of the pre-expanded metal.

When expansion force is applied to slit metal or intermediate product, the longitudinal expansion is accompanied by a transverse contraction. This effect is most pronounced at high stretching angles, and in particular at stretching angles above about 85 degrees. According to the invention the force transmitters are arranged so that they can move towards each other in the second direction while applying extension force. In this way the expansion force can continue to be evenly distributed to the expanded metal in the course of the expansion. In this way it is prevented that e.g. the expansion is larger at the circumference of the sheet as compared to the central region. Therefore it is achieved that deviations from the repetition length over the sheet are minimized and a relatively uniform shape of openings is obtained, also and in particular for overstretched expanded metal.

In an advantageous embodiment the force transmitters have the form of substantially parallel arms provided with hooks for engaging the expanded metal.

In another advantageous embodiment a tool is used that comprises two sets of parallel members connected with joints to each other so as to form a hingeable grid that can assume configurations with different tool angles between the sets of parallel members, wherein the force transmitters are arranged on the grid and extending out of the plane of the grid.

The expression "force transmitter" is used to refer to a pin, tenon, pivot, wedge or other means of suitable shape to transmit force to the expanded metal.

BRIEF DESCRIPTION OF THE DRAWINGS

The invention will now be described by way of example in more detail with reference to the accompanying drawings, wherein.

DETAILED DESCRIPTION OF THE INVENTION

Figure 1:
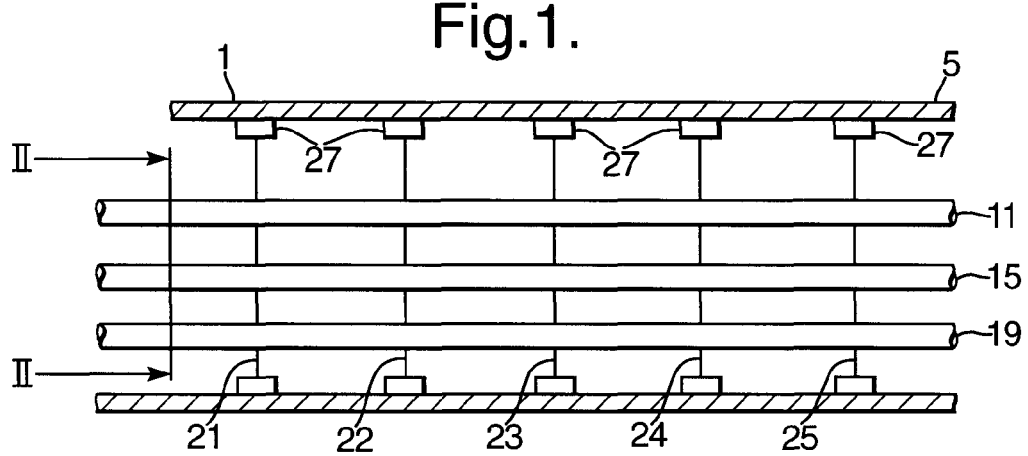
FIG. 1 shows schematically part of a longitudinal section through a heat exchanger including a tube bundle supported by the support of the present invention.

Reference is made to FIG. 1 showing part of a longitudinal section through a heat exchanger 1 in the form of a cylindrical vessel having a cylindrical shell 5. A tube bundle formed of a plurality of parallel tubes, of which tubes 11, 15, and 19 are shown, is installed in the heat exchanger. The length direction of the tubes is parallel to the axis of the cylindrical shell 5. The support for the tube bundle is formed by axially spaced apart transverse support plates 21, 22, 23, 24 and 25 supporting the intermediate parts of the tubes in the cylindrical shell 5 (not shown). Please note that FIG. 1 does not show the end parts of the tubes with the tube sheet.

Figure 2:
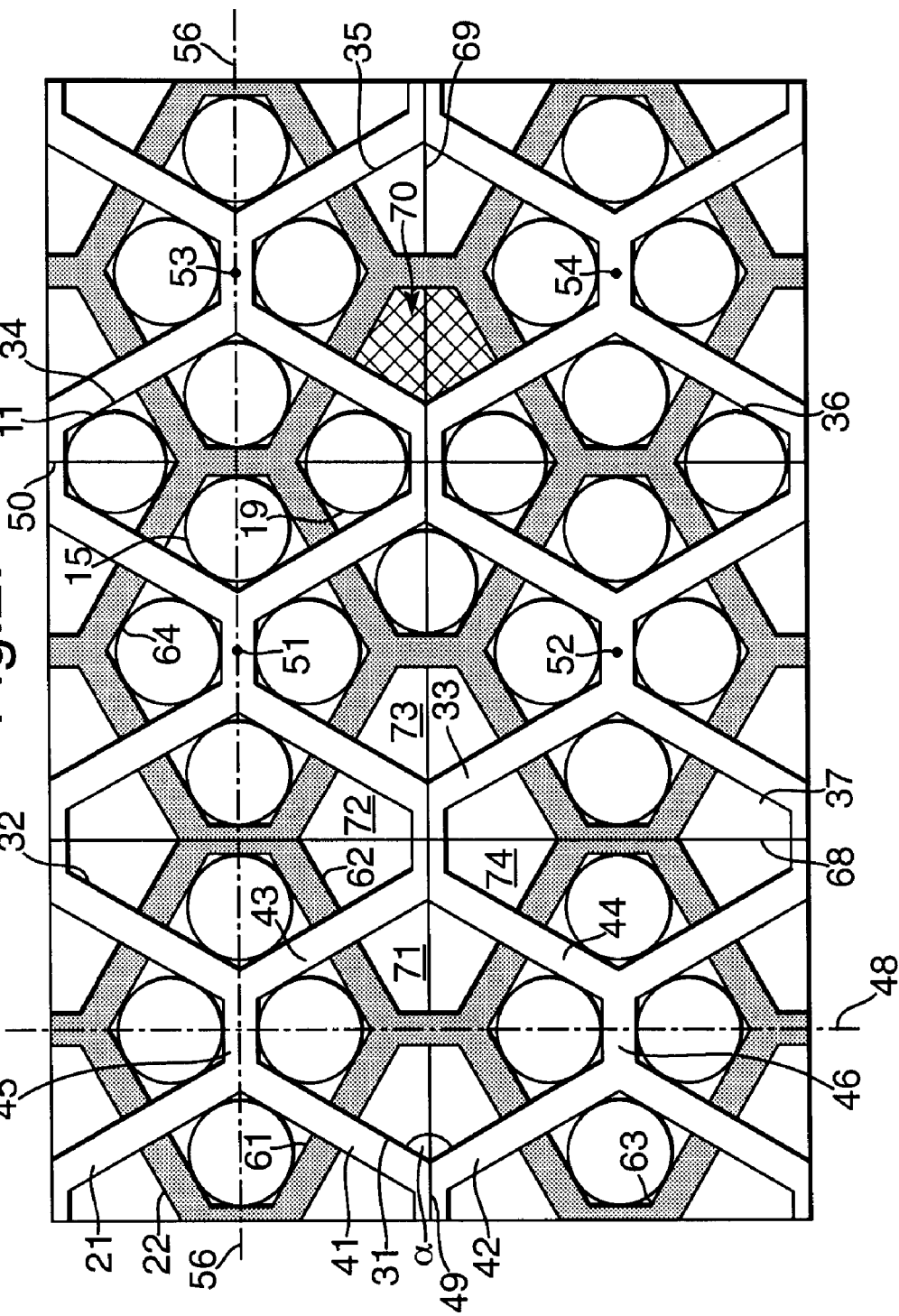
FIG. 2 shows schematically an embodiment of support plates according to the invention, in a view along line II-II of FIG. 1 and drawn at a larger scale.

Reference is made to FIG. 2 showing schematically a suitable geometry of the arrangement of openings in support plates, as a view of the central part of support plates 21 and 22 along the longitudinal axis of the cylindrical shell 5 in FIG. 1. For the sake of clarity, FIG. 2 is drawn at a larger scale than FIG. 1, therefore the annular part of the support plates 21 and 22 is not visible. It shall be clear that the regular grid shown in FIG. 2 extends over at least the cross-section of the heat exchanger that is occupied by parallel tubes, and that the annular parts of the support plates are attached to the shell in a suitable way. The other support plates of FIG. 1 are not shown in FIG. 2 for the sake of clarity.

We will first discuss the characteristics of support plate 21. Plate 21 is provided with a plurality of openings, openings 31,32,33,34,35,36,37 are indicated with a reference numeral. Each of the openings has substantially frustro-rhombical shape, which will be explained at the hand of opening 31. Opening 31 is defined by two pairs of neighboured longer sides (strands), the pair 41,42 and the pair 43,44. Each of the two pairs forms a V-shape and defines the same angle α which is this example is as close as practically possible to 120 degrees. The end points of the V-shaped pairs are symmetrically connected by a pair of parallel shorter sides (bonds) of equal length 45,46. The relative size of strands and bonds as shown defines an opening of frustro-rhombical shape. If the bonds 45,46 were much shorter than the strands 41,42,43,44, say only one-fifth of the length of the strands or less, than a substantially rhombical shape of the opening would be obtained.

Opening 31 has two mirror symmetry axes, 48, 49. The opening is elongated along axis 48, and axis 48 is a characteristic mirror symmetry axis of opening 31. As will be discussed further below, the axis 48 coincides with the stretching direction when the support plate 21 is made of a sheet of expanded metal.

The openings of support plate 21, at least in the central part, form a regular grid as shown. All openings are of equal size and shape, and are elongated along their respective characteristic mirror axis, along or parallel to axis 48. The characteristic direction of support plate 21 is indicated as 50.

The regular grid of plate 21 has equal repetition lengths along the characteristic direction 50 and perpendicular to the characteristic direction, i.e. the distance between points 51 and 52 and between points 53 and 54 is the same as the distance between points 51 and 53 and between points 52 and 54. Points 51,52,53,54 are centrepoints of neighbouring bonds, wherein points 51 and 53 are on the same centreline 56 of bonds, and wherein points 51 and 52 are centrepoints of the bonds belonging to the same opening 33.

Each of the openings in support plate 21 is large enough to accommodate four tubes. Tubes 11, 15, 19 are indicated in FIG. 2, a number of other tubes are shown but have not been given reference numerals for the sake of clarity.

Support plate 22 is generally similar to support plate 21, in particular the shape, size and arrangement of openings in the central portion shown in FIG. 2 is the same.

Only openings 61,62,63,64 of support plate 22 are indicated with reference numerals. The two mirror symmetry axes of opening 62 are indicated as 68,69. The opening 62 is elongated along axis 69, axis 69 is therefore the characteristic mirror symmetry axis of opening 62, and at the same time represents the characteristic direction of support plate 22.

Support plate 22 has been rotated by 90 degrees with respect to support plate 21 in the paper plane. i.e. about the length direction of tubes running perpendicular to the paper plane. So the characteristic directions of the two plates, 50 and 69, are perpendicular. Also, the characteristic mirror symmetry axes of the openings in support plate 21 (all parallel to axis 48) are perpendicular to the characteristic mirror symmetry axis of the openings in support plate 22 (all parallel to axis 69). Support plates 21 and 22 are arranged such that the centre points of the bonds of one plate project onto the centre points of the openings of the other plate.

The co-operating openings in the support plates 21,22 form support passages for a bundle of parallel tubes. One such support passage is indicated by the hatched area with reference numeral 70; all other areas in the Figure with the same size as the hatched area are also support passages. Support passages extending through the same opening in one support plate extend through different openings in another support plate. For example, the four support passages 71,72,73,74 extending through opening 62 in support plate 22, extend through openings 31,32,33,37, respectively, in support plate 21. Tubes are not shown in these and some other support passages for the sake of clarity. It shall be clear that a tube can be arranged in each support passage.

Tubes extending through the support passages can be supported from five different sides. In a particular example of the arrangement of FIG. 2, the tubes are 19 mm in diameter and the shortest distance between adjacent tubes is 6 mm, and the width of the cross-laths (strands and bonds) in the transverse plane is also 6 mm. In a single support plate, each tube is however only supported from a maximum of two, or three, sides. Therefore fluid in the shell side can flow easily in longitudinal direction. If tubes are smaller that the cross-section of support passages permit, the support will only be provided by the lower sides of the openings.

Suitably the support plates 23 and 25 of FIG. 1 are arranged like plate 21 in FIG. 2, and support plate 24 like plate 22. Clearly, due to the mutually perpendicular orientation characteristic directions (elongation directions) of the support plates the mirror symmetry axes of openings forming a support passage extend into different directions. E.g., axis 48 of opening 31 extends into the perpendicular direction in the plane of the plate with respect to axis 69 of opening 62, which two openings belong to support passage 71.

The support passages provided by the embodiment shown in FIG. 2 are not on an equilateral triangular pitch or square pitch. However, the arrangement is very similar to a triangular pitch and has similar high packing density. The axes of every three nearest neighboured tubes are on the cornerpoints of an equilateral triangle.

A further advantage of the arrangement of FIG. 2 is that a strand or bond between two neighbouring tubes runs perpendicular to a virtual line connecting the axes of the tubes in the transverse plane. This means that the width of strands and bonds in the transverse plane can be equal to the shortest distance between neighbouring tubes. Obstruction of fluid flow in the shell side is on the other hand not a problem, since a tube is only supported on two or three sides of a substantially pentagonal shaped support passage. In this way for a high packing density of tubes (comparable to tubes on a triangular pitch) maximum mechanical stability and strength, and optimum shell side fluid flow are provided. This is an advantage over the prior art; for comparison it is observed that in both embodiments of supports for tubes on a triangular pitch of U.S. Pat. No. 4,143,709, FIGS. 3 and 4, the width of the supporting cross-laths must be chosen smaller than the shortest distance between neighbouring tubes.

A particular characteristic of the geometry of the arrangement of support plates discussed with reference to FIG. 2 is that each support plate forms a grid with equal repetition lengths along the characteristic direction 50 and perpendicular to the characteristic direction. In conventional expanded metal the repetition length in the stretching direction is always less than the repetition length in the perpendicular direction. The present invention provides expanded metal that can be used as support plates 21, 22, . . . , 25 in an arrangement of FIG. 2, or more general in an arrangement wherein plates are rotated by 90 degrees with respect to each other.

Figure 3:
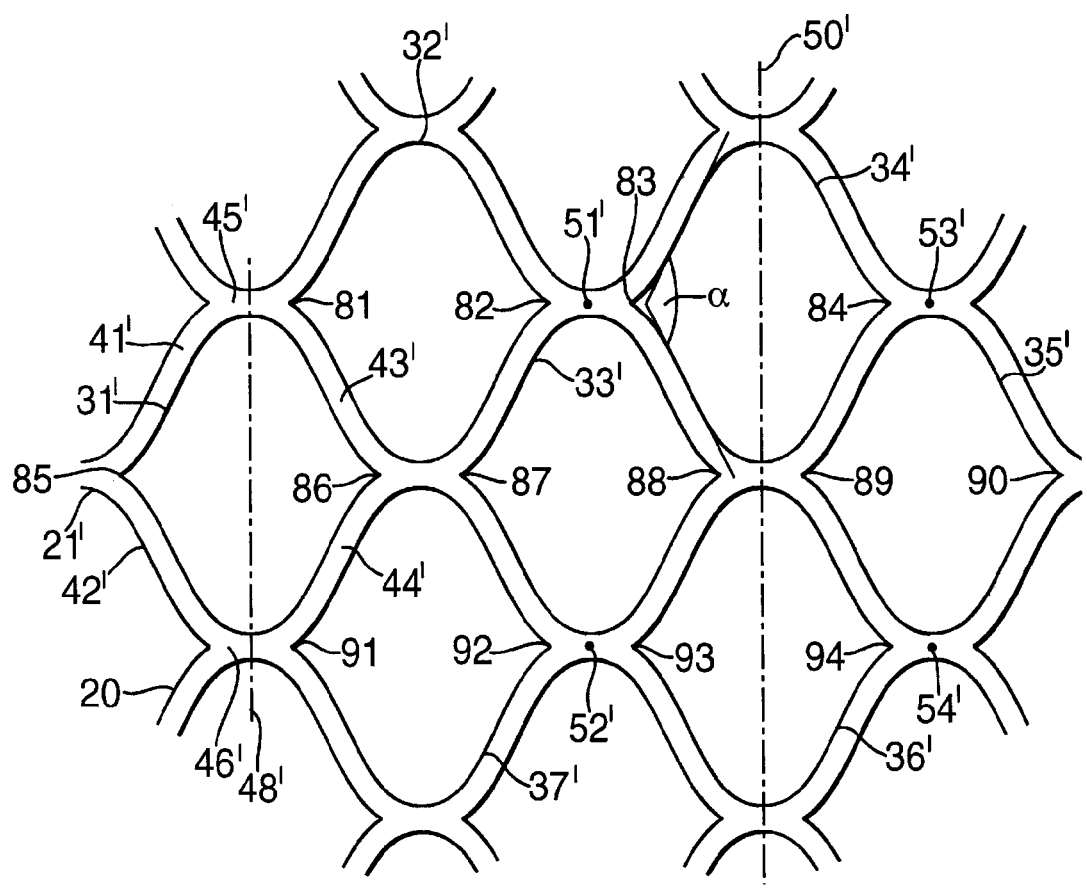
FIG. 3 shows schematically a sheet of over-stretched expanded metal for use in a tube support according to FIG. 2.

The geometry of openings in expanded metal deviates from the idealized frustro-rhombical shape of the openings shown in FIG. 2. This will now be discussed. An example of expanded metal according to the invention indicating the actual shape of substantially frustro-rhombical openings in FIG. 2 is shown in FIG. 3. Reference numerals used in FIG. 3 corresponding to those used with reference to FIG. 2 are primed.

The stretching direction is the characteristic direction 50. The stretching angle corresponds to the angle α in FIG. 2, i.e. the expanded metal is overstretched (stretching angle 120 degrees).

The sheet of expanded metal 20 of FIG. 3 has been manufactured by cutting a sheet of metal along virtual staggered parallel dashed lines. Following slitting, the sheet was expanded along the direction of line 50' (characteristic direction). The slits before expansion correspond to pairs of corner points visible in FIG. 6, e.g. pair 81 and 82, pair 83 and 84; 85 and 86; 87 and 88; 89 and 90; 91 and 92; 93 and 94. The length of the bonds (the non-slit parts along a virtual dashed line) is relatively long, i.e. longer than about one-fifth of the length of the strands (cross-laths in between bonds). E.g., the distance between points 82 and 83 or between points 86 and 87 (length of bonds) is compared with the distance between points 81 and 86 or between points 88 and 93 (length of strands). The frustro-rhombical shape of the openings in the sheet of expanded metal is best appreciated when the corner points 81, 82, . . . , 94 are considered.

The strands of the actual expanded metal, e.g. 41',42',43' and 44' belonging to opening 31', are slightly S-shaped. Also, the strands and the bonds are twisted about their length, which diminishes their cross-section and reduces resistance for fluid flow in the shell side. For example, tubes of 19 mm diameter and a shortest spacing of 6 mm between the tubes in the arrangement shown in FIG. 2 can be supported by a expanded metal plates manufactured from 2 mm thick steel, wherein the slits before expansion were arranged along staggered parallel dashed lines that are 8 mm spaced. Due to the twisting of strands and bonds that occurs during stretching, the effective width of strands and bonds in the transverse plane is maximal 6 mm at the points where the tubes are supported. Further, due to the tilting of strands and bonds the resistance imposed on fluid flow in the shell side is less than that of a non-tilted cross-lath.

It is observed that at the two corner points that belong to each opening the opening exhibits sharp notches, e.g. at the corner points 85 and 86 of opening 31'. The remaining part of the opening is smoothly rounded. The overall shape of openings formed in expanded metal therefore to some degree resembles a double bell shape.

The stretching angle α defined by the central parts of a substantially V-shaped pair of strands adjoined in the direction of stretching is shown for opening 34', and is in this example as close as practically possible to 120 degrees. Despite all deviations from the idealized shape of openings in FIG. 2, the expanded metal sheet 20 has equal repetition lengths along the stretching direction 50 and perpendicular to the stretching direction, i.e. the distance between points 51' and 52' and between points 53' and 54' is the same as the distance between points 51' and 53' and between points 52' and 54'.

Figure 4:
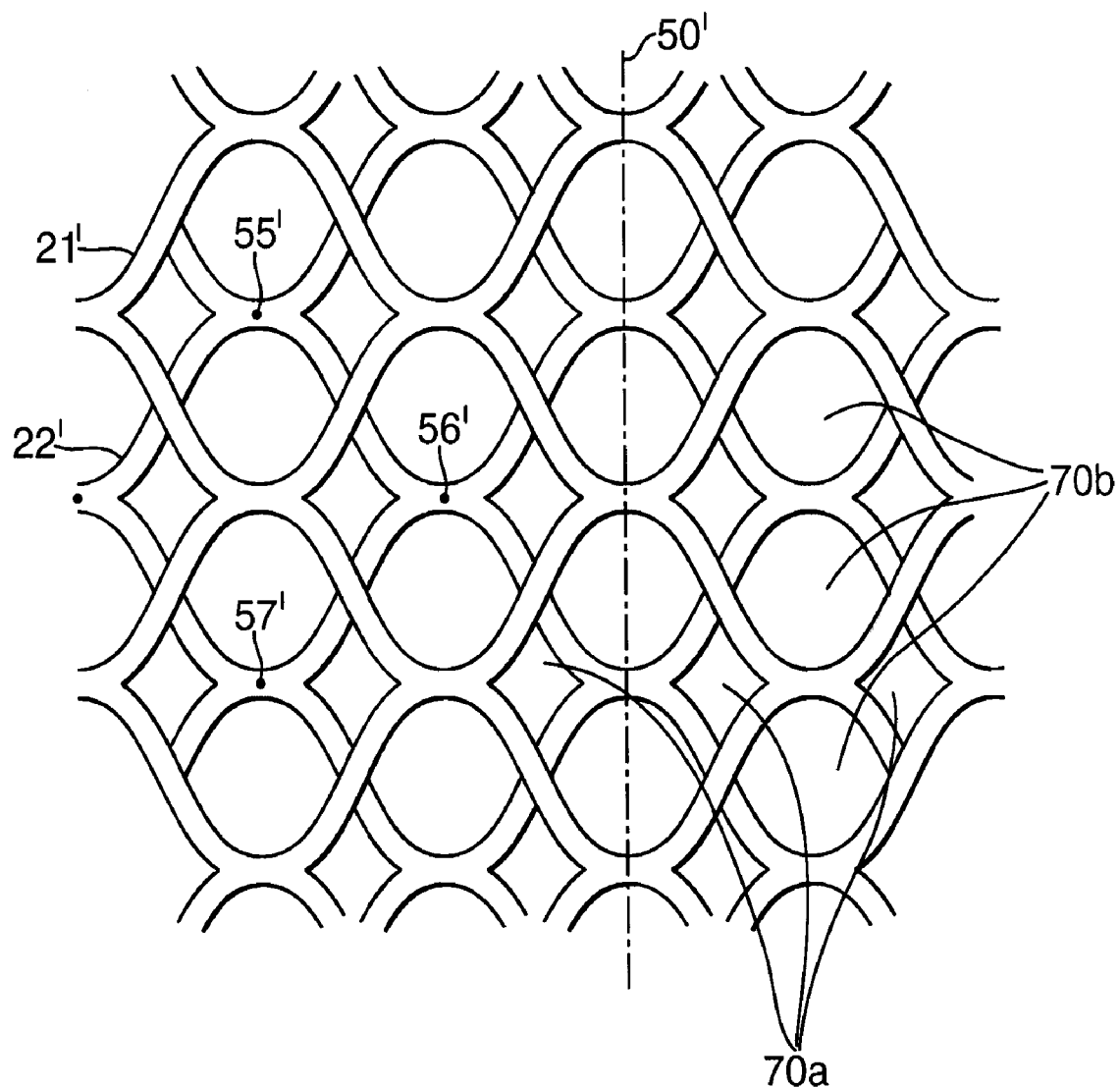
FIG. 4 shows schematically support passages formed when two sheets of expanded metal of FIG. 3 are laterally displaced relative to each other.

FIG. 4 shows support passages that would be obtained when two sheets of expanded metal as in FIG. 2 would be laterally displaced similar to the support plates in U.S. Pat. No. 4,143,709. FIG. 2 shows the support plate 21' of FIG. 2 and an identical support plate 22' there behind. Plate 22' is laterally shifted by half a repetition length perpendicular to the direction of stretching 50' (or along the direction of stretching) with respect to plate 21', so that the projection of centrepoints of the bonds of plate 22', e.g. 55',56',57', are in the centre of the openings of plate 21'. The direction 50' is also the direction of stretching of plate 22'. The Figure illustrates that the lateral shifting results in two types of support passages being formed. Type 70a, of which a few examples are indicated, has two notch-like corner points in its cross-section, and the other type 70b does not have any notch-like corner points in its cross section. (Not all support passages of either type have been given a reference numeral for the sake of clarity.) The difference in cross-sections appears rather large since the width of strands with respect to the size of the openings has been slightly exaggerated for the sake of clarity. If a bundle of identical parallel tubes is to be supported by an arrangement as in FIG. 4, the maximum diameter of the tubes is determined by the passages of type 70a, and the tubes are not fully supported in the larger passages 70b.

Figure 5:
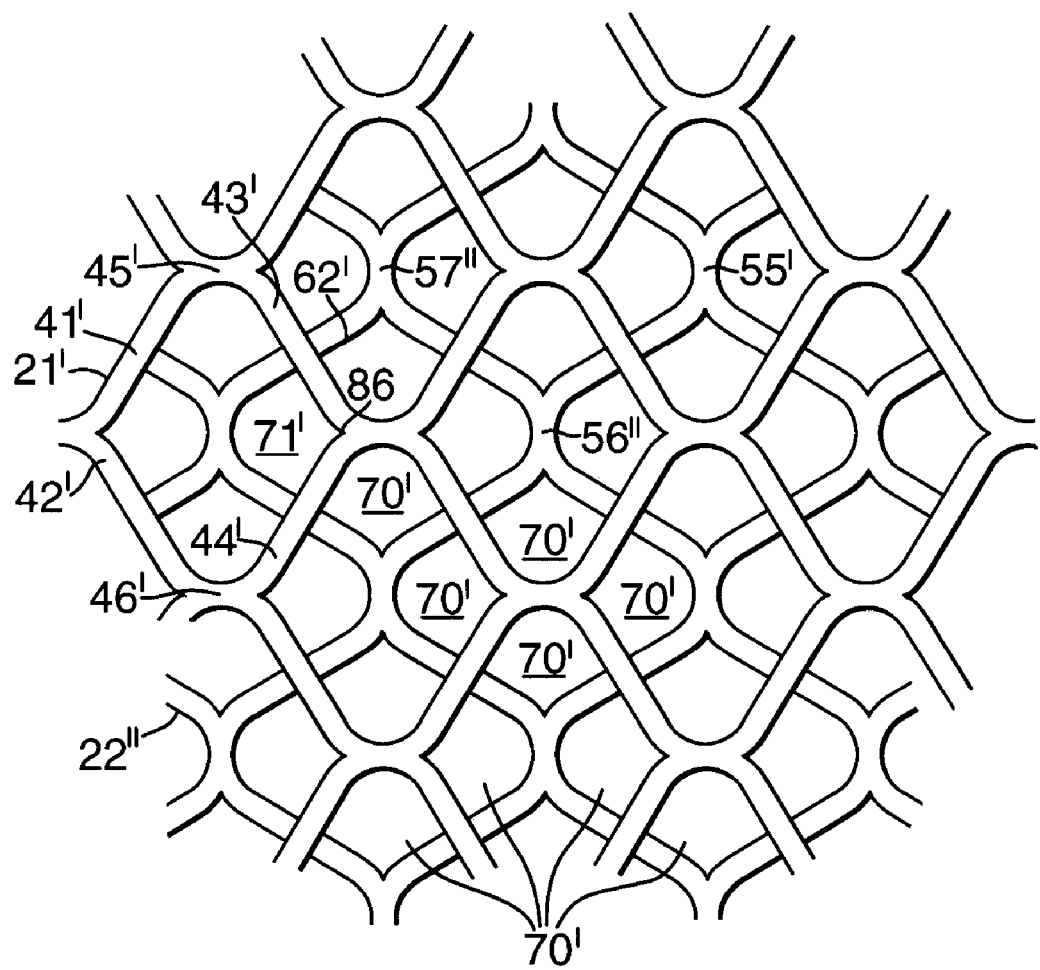
FIG. 5 shows schematically support passages formed when two sheets of expanded metal of FIG. 3 are rotated relative to each other according to the invention.

FIG. 5 shows schematically the cross-section of support passages that are obtained with expanded metal with equal repetition lengths in both dimensions according to the invention. FIG. 5 resembles the arrangement of support plates discussed with reference to FIG. 2, wherein plates 21' and 22" are made from identical expanded metal sheets as the one shown in FIG. 3. Plate 22" behind plate 21' is rotated by 90 degrees in the paper plane and arranged such that the projection of the centrepoints of the bonds of plate 22", e.g. 55", 56", 57", are in the centre of the openings of plate 21'. In this arrangement according to the invention only one type of support passages 70' is formed. (Not all support passages have been given a reference numeral for the sake of clarity.) Each cross-section of support passages, e.g. the cross section of passage 71', is delimited by five sides, one of which is formed by a bond, e.g. of opening 62', two of which are formed by strands extending from the end of this bond, and two other sides being formed by a pair of V-shaped strands on the other support plate, e.g. 43' and 44'. Each cross-section of a support passages has one notch-like corner point, e.g. 86. The invention therefore allows the arrangement of relatively uniform support passages with support plates made from expanded metal, despite the deviations from the idealised frustro-rhombical shape.

Figure 6:
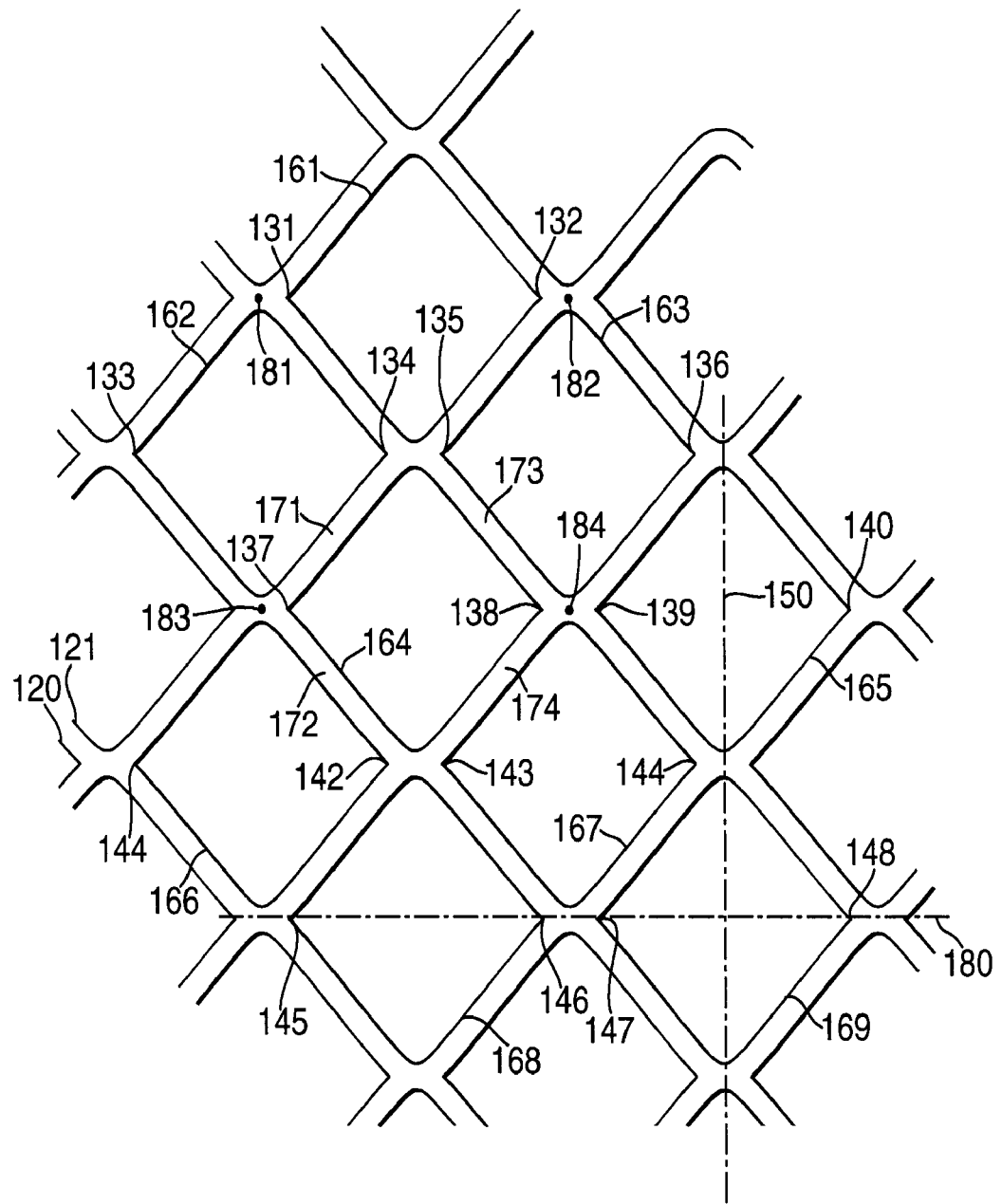
FIG. 6 shows schematically another embodiment of a sheet of over-stretched expanded metal for use in a tube support according to the invention.

Reference is made to FIG. 6 showing schematically another embodiment of a sheet of expanded metal 120 according to the present invention. The shown part of the sheet of expanded metal is the central portion of a support plate 121 for a bundle of parallel tubes according to the invention, like support plate 21 in FIG. 1.

The sheet of expanded metal 120 has been manufactured by slitting a sheet of metal along virtual staggered parallel dashed lines. Following slitting, the sheet was expanded along the direction of line 150. The slits before expansion correspond to pairs of corner points visible in FIG. 6, e.g. pair 131 and 132; pair 133 and 134; 135 and 136; 137 and 138; 139 an 140; 141 and 142; 143 and 144; 145 and 146; 147 and 148. The length of the bonds (the non-slit parts along a virtual dashed line) is much shorter, i.e. less than about one-fifth of the length of the strands (equivalent to the length of the cuts before expansion). E.g., the distance between points 138 and 139 or between points 142 and 143 (length of bonds) is compared with the distance between points 134 and 137 or between points 138 and 144 (approximate length of strands). The width of the strands in relation to the size of the openings has been slightly exaggerated for the sake of clarity.

The sheet of expanded metal 120 forms a regular grid of openings, of which openings 161, 162, 163, 164, 165, 166, 167, 168, 169 are indicated. Each opening is defined by two pairs of strands that are neighboured in the direction of stretching and two bonds interconnecting the two pairs of strands at the ends of the V-shapes. E.g., opening 164 is defined by the pair of strands 171 and 172, and by the pair 173 and 174, and by the bonds between points 134 and 135 and between points 142 and 143. Each pair of strands forms generally a V-shape defining the same stretching angle.

In the embodiment of FIG. 6 the bonds are somewhat longer along 180 than their width in the stretching direction 150. Therefore the stretching angle is just larger than 90 degrees, i.e. such that the grid defined by the centrepoints of the bonds is regular quadratic. Sheet 120 is therefore an over-stretched sheet of expanded metal according to the invention. Centrepoints of bonds are the points symmetrically between corner points defining a bond (e.g. between points 134 and 135 or between points 142 and 143), and only 181, 182, 183, 184 have been indicated for the sake of clarity in the Figure. Corner points represent the end points of slits before stretching of the expanded metal. The repetition lengths of the regular grid defined by the expanded metal sheet 120, in the direction of stretching and perpendicular to the direction of stretching, are both equal to the shortest distance between two centrepoints of bonds times the square root of 2.

The strands of the actual expanded metal, e.g. 171,172, 173,174, are slightly S-shaped. Also, the strands are twisted about their longitudinal axis, which diminishes their cross-section and reduces resistance for fluid flow in the shell side. At the two corner points that belong to each opening the opening exhibits sharp notches, e.g. at the corner points 137 and 138 of opening 164. The remaining part of the opening is relatively smoothly rounded.

Each opening has two mirror symmetry axes. E.g., opening 169 has two mirror symmetry axes along the stretching direction 150 and along a line 180 perpendicular to the stretching direction, through corner points 147 and 148. Due to the deviations from quadratic shape of the openings in expanded metal (slightly S-shaped strands), the two symmetry axes 150 and 180 are significantly different from each other. The mirror symmetry axis 150 along the stretching direction is therefore unique, and is selected as the characteristic mirror symmetry axis. Line 150 is at the same time the characteristic direction of the support plate 121. It is also noted that there is no rotational symmetry regarding rotation by 90 degrees and that there are no mirror symmetry axes at 45 degrees from the stretching direction 150. This is a difference with a perfect quadratic shape and also with the shape of the generally quadratic openings known from U.S. Pat. No. 4,143,709 which have more than two mirror symmetry axes.

Figure 7:
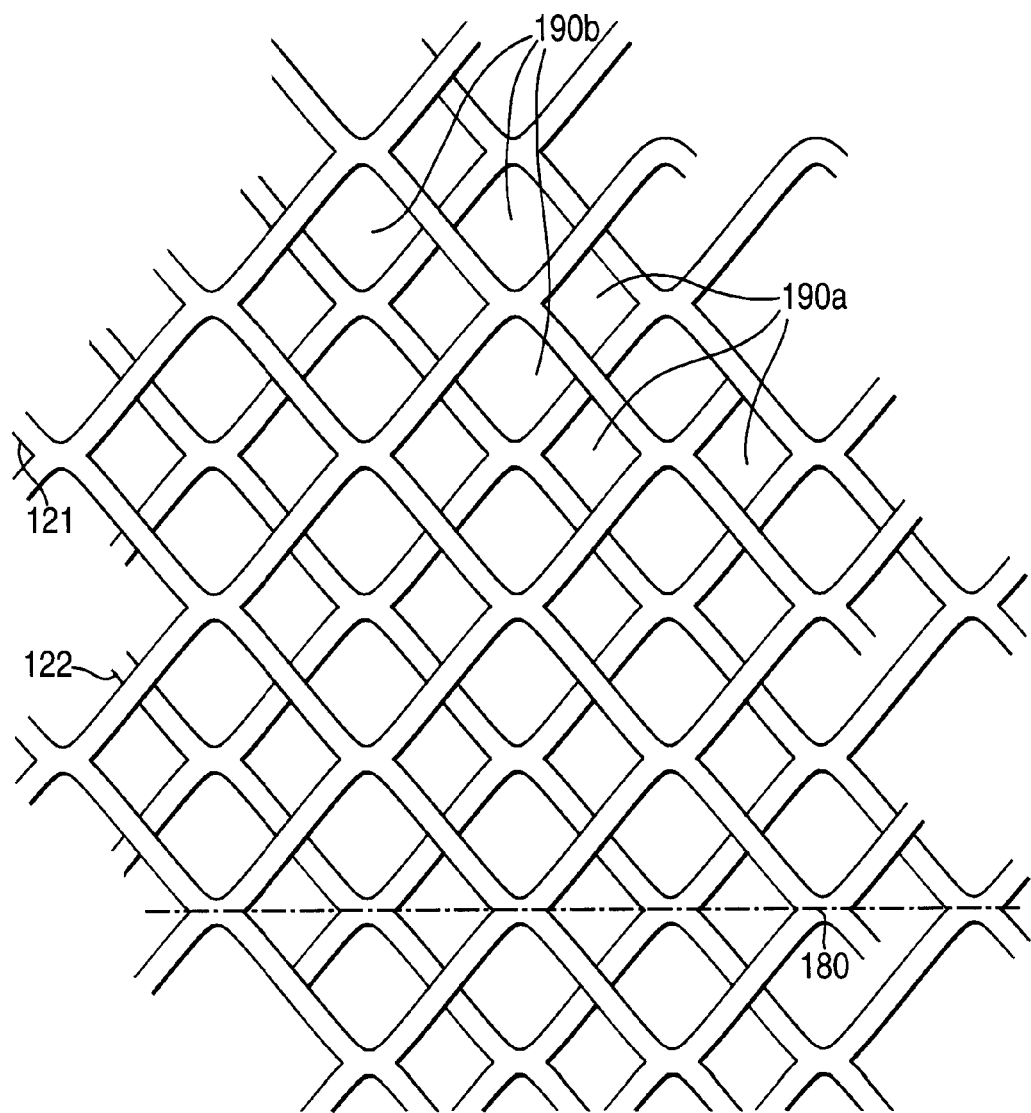
FIG. 7 shows schematically support passages formed when two sheets of expanded metal shown in FIG. 6 are laterally displaced relative to each other as in the prior art.

FIG. 7 shows support passages that would be obtained when two sheets of expanded metal as in FIG. 6 would be laterally displaced similar to U.S. Pat. No. 4,143,709. FIG. 7 shows the support plate 121 of FIG. 6 and an identical support plate 122 there behind, analogous to the view of FIG. 2 with regard to FIG. 1.

Plate 122 is laterally shifted by half a repetition length along line 180 with respect to plate 121, so that the projection of centrepoints of the bonds of plate 122 are in the centre of the openings of plate 121. The Figure illustrates that also in this example the lateral shifting results in two types of support passages being formed. Type 190a with two notch-like corner points in its cross-section, and type 190b without any notch-like corner points in its cross section. Not all support passages have been given a reference numeral for the sake of clarity.

Figure 8:
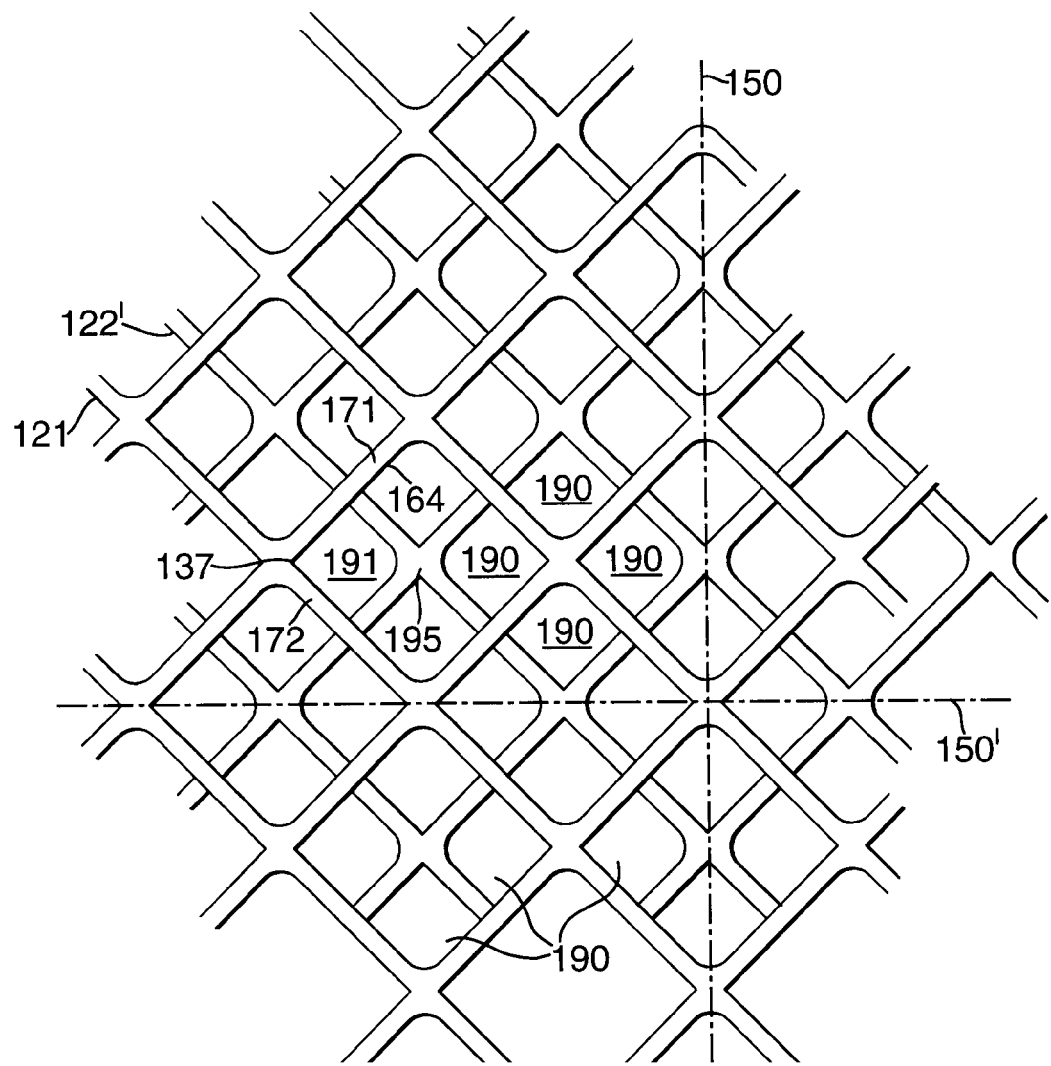
FIG. 8 shows schematically support passages formed when two sheets of expanded metal shown in FIG. 6 are rotated relative to each other according to the invention.

FIG. 8 shows schematically the cross-section of support passages that are obtained when two support plates of expanded metal of FIG. 6 are rotated relative to each other. FIG. 8 resembles the arrangement of support plates discussed with reference to FIGS. 2 and 5, but wherein plates 121 and 122' are made from identical expanded metal sheets as the one shown in FIG. 6. Plate 122' behind plate 121 is arranged according to the invention such that the characteristic directions (parallel to the stretching directions 150' of plate 122' and 150 of plate 121) are rotated by 90 degrees relative to each other in the paper plane. The plates are arranged such that the projection of the centrepoints of the bonds of plate 122' are in the centre of the openings of plate 121. In this arrangement of expanded metal according to the invention the grids match and only one type of support passages 190 is formed. (Not all support passages have been given a reference numeral for the sake of clarity.)

Each cross-section of support passages, e.g. the cross section of passage 191, is delimited by four sides, two of which are formed by a V-shaped pair of strands, e.g. 171,172, extending from a corner point of a bond, e.g. 137, and two other sides being formed by a two strands smoothly connected by a bond, e.g. 195 on the other support plate 122'. Each cross-section of a support passage has one notch-like corner point (e.g. 137). Also in this embodiment the invention provided relatively uniform support passages with support plates made from expanded metal, despite the deviations from the idealised frustro-rhombical shape.

In order to provide equal repetition lengths in the stretching and the perpendicular directions, it depends on the relative size of bonds and strands which stretching angle is required. Generally, the longer the bonds relative to the strands are, i.e. the longer the non-slit part relative to the slits along a virtual dashed line is during manufacture, the larger the stretching angle must be.

The support passages formed by the support passages of an arrangement like in FIG. 5 or 8 are suitably of a size such that standard tubes used in heat exchangers are well supported. Standard diameters are e.g. 19.05 mm (¾ inch), 20 mm, 25 mm, 25.4 mm (1 inch). Standard shortest distances between tube surfaces are 6 mm or 6.35 mm (¼ inch).

In a typical heat exchanger of about 6 m length and 1 to 3 m diameter, many hundred to a few thousand tubes are arranged. The skilled person knows how to determine the spacing and dimensions of the support baffles. Typical spacings are between 10 and 70 cm in the length direction of the tubes. Thickness of the plates is mainly determined by mechanical requirements, and can typically be in the range 1.6 mm-5 mm.

Although it is not required nor necessarily desirable, the expanded metal can be of the flattened type.

A particular application of the present invention is in chemical reactors comprising a tube bundle in a shell, for example as used in the production of ethylene oxide. A very open tube support structure is here often required.

Overstretched expanded metal according to the invention can be manufactured in any suitable way. This can be done in a single step using basically a conventional technology for producing expanded metal, but expanding to a larger stretching angle. It is also possible to produce, in a first step, conventional expanded metal as an intermediate product, and to overstretch the intermediate product in a second step to obtain the overstretched expanded metal. Obviously the second step can also be applied to conventional expanded metal obtained from a different source, e.g. purchased in the market.

When expansion force is applied to slit metal or intermediate product, the longitudinal expansion is accompanied by a transverse contraction. This effect is most pronounced at high stretching angles, and in particular at stretching angles above about 85 degrees.

Figure 9:
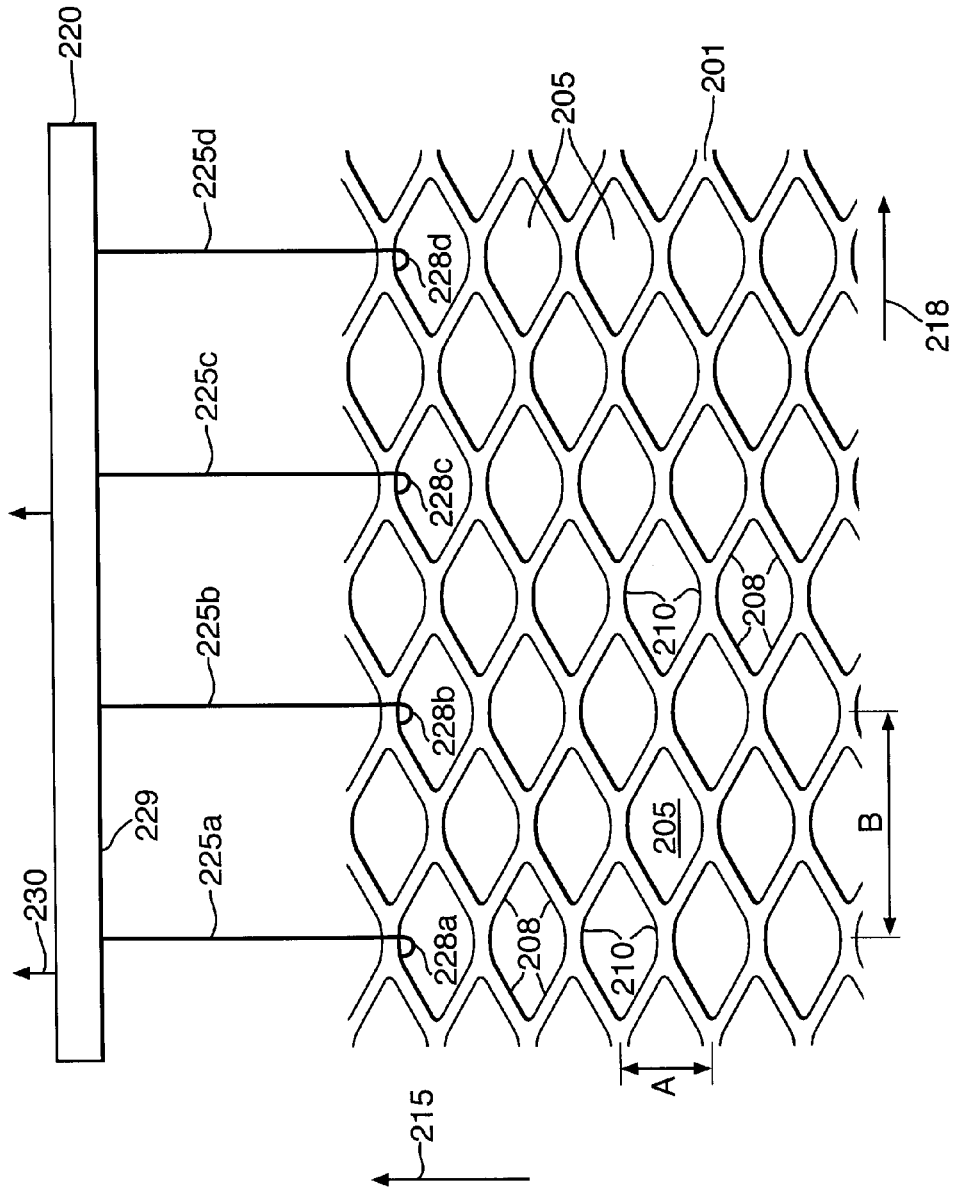
FIGS. 9 and 10 show schematically the beginning and end situations of a first embodiment of a method according to the invention for expanding pre-expanded metal to its final size.
Figure 10:
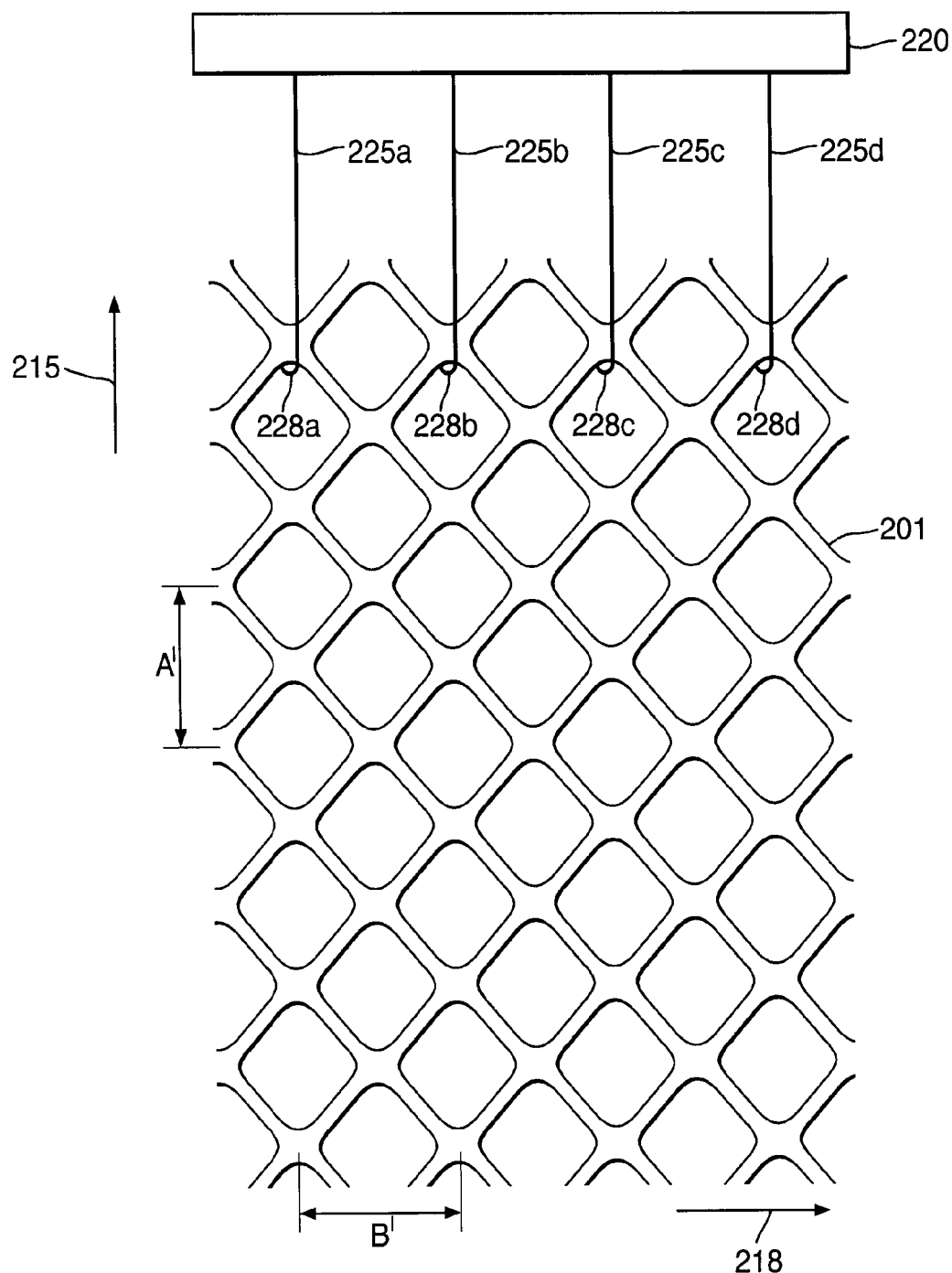

With reference to FIGS. 9 and 10 a first embodiment of a method according to the invention for producing expanded metal will now be discussed. FIG. 9 shows (part of) a conventional sheet of expanded metal 201 produced by slitting and stretching a sheet of metal. The sheet 201 in FIG. 9 represents pre-expanded metal forming a grid of openings 205. Each opening is defined by four strands 208 and two bonds 210. For the sake of clarity only for a few openings, bonds and strands a reference numeral has been indicated. The grid has a first repetition length A in the direction of stretching 215 and a second repetition length B in the direction 218 perpendicular to the direction of stretching 215. The ratio of A/B is smaller than 1.

The second expansion step to achieve the desired ratio of repetition lengths is performed using a tool 220 that is provided with a number of arms 225a,b,c,d provided with hooks 228a,b,c,d at one end and being slideably mounted at their other end from which side 229 the expansion force is applied. The arms with the hooks serve as force transmitters, and co-operate with a number of bonds along the direction 218. When the expansion force is applied in the direction of arrow 230, the arms 225 are allowed to move closer to each other following the contraction of the expanded metal sheet 201 along the direction 218. The arms can remain parallel, so that the expansion force is evenly distributed to the expanded metal. In this way minimum deviations from the desired uniform shape of the openings and repetition length in the final expanded metal are achieved. The final situation is shown in FIG. 10, wherein in this example the repetition lengths A' and B' are equal.

Instead of passively allowing the arms to move together they can also be actively moved so as to remain parallel.

It shall be clear that arms can also be arranged to co-operate with more or other points of the expanded metal, for example also at different positions along the direction 215.

Instead of rigid arms also flexible cable can be used. Instead of making the arms or cable slideable at the side 229 where the expansion force is applied, it may be sufficient to make the arms or cable pivotable at that side and long enough, so that the deviations from a parallel arrangement due to lateral movement of the hooks during expansion are negligible. This is for example the case if the maximum angle between arms or cables in the course of the expansion is less than 10 degrees.

Figure 11:
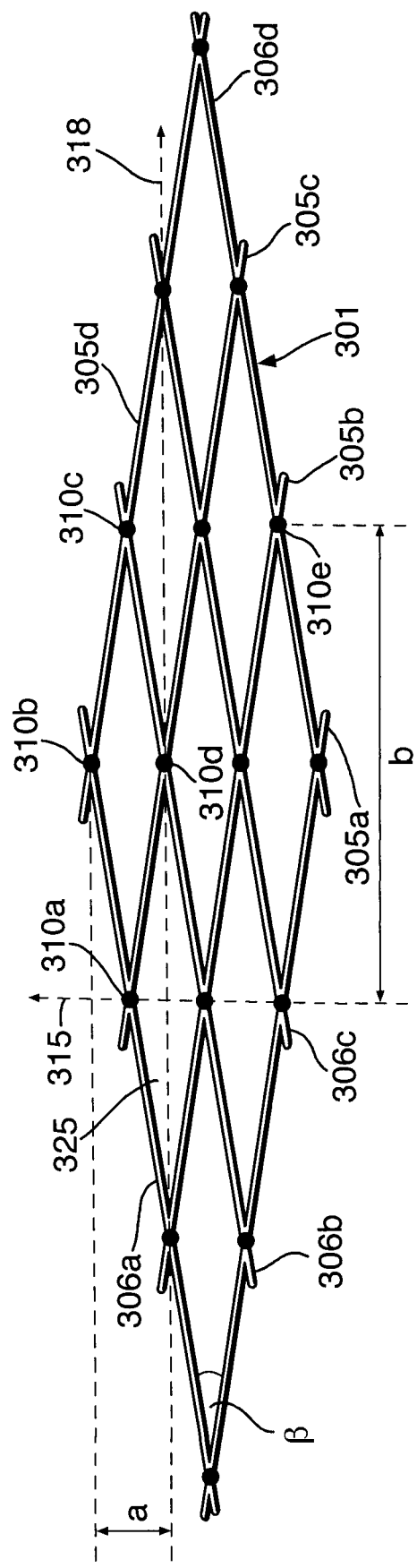
FIG. 11 shows schematically an embodiment for a tool for further expanding pre-expanded metal

Reference is made to FIG. 11, showing schematically another tool that can be used for expanding the pre-expanded metal to its final shape. The tool 301 forms a hingeable grid. In the shown embodiment it is a regular grid formed of two sets of parallel members in the form of bars 305a,b,c,d and 306a,b,c,d. Each bar of one set is pivotably connected to all bars of the other set. In the shown embodiment the spacing between all pairs of neighbouring parallel bars is the same.

Only a few joints, 310a,b,c,d,e, are indicated with a reference numeral for the sake of clarity. The configuration of the grid can be characterized by the tool angle $\beta$ between the sets of bars. For the regular grid shown a particular angle corresponds to particular repetition lengths a and b in a first direction 315 and a second direction 318, wherein the two directions are suitably along the diagonals of a grid opening 325.

The tool can be pivoted so as to assume another configuration having another angle and ratio of repetition lengths. When the longer repetition length is shortened, simultaneously the shorter repetition length is increased. When the tool angle $\beta$ is 90 degrees, the repetition lengths are equal.

The pivots connecting the bars at the joints suitably extend some distance out of the plane of the grid, so that they can serve as force transmitters. The force transmitters are suitable shaped to interact with the expanded metal.

In order to expand pre-expanded metal to its final state, the tool is brought into a first configuration having a first tool angle $\beta$, and engaged with the pre-expanded metal. Then the tool is moved into a second configuration having a second tool angle $\beta$. The force transmitters will move away from each other in one direction (315) and will simultaneously move towards each other in the perpendicular direction (318). The force transmitters interact with a plurality of points on the expanded metal thereby applying simultaneously expansion force in the stretching direction and simultaneously compression force perpendicular thereto, to bring the expanded metal into the desired form.

Figure 12:
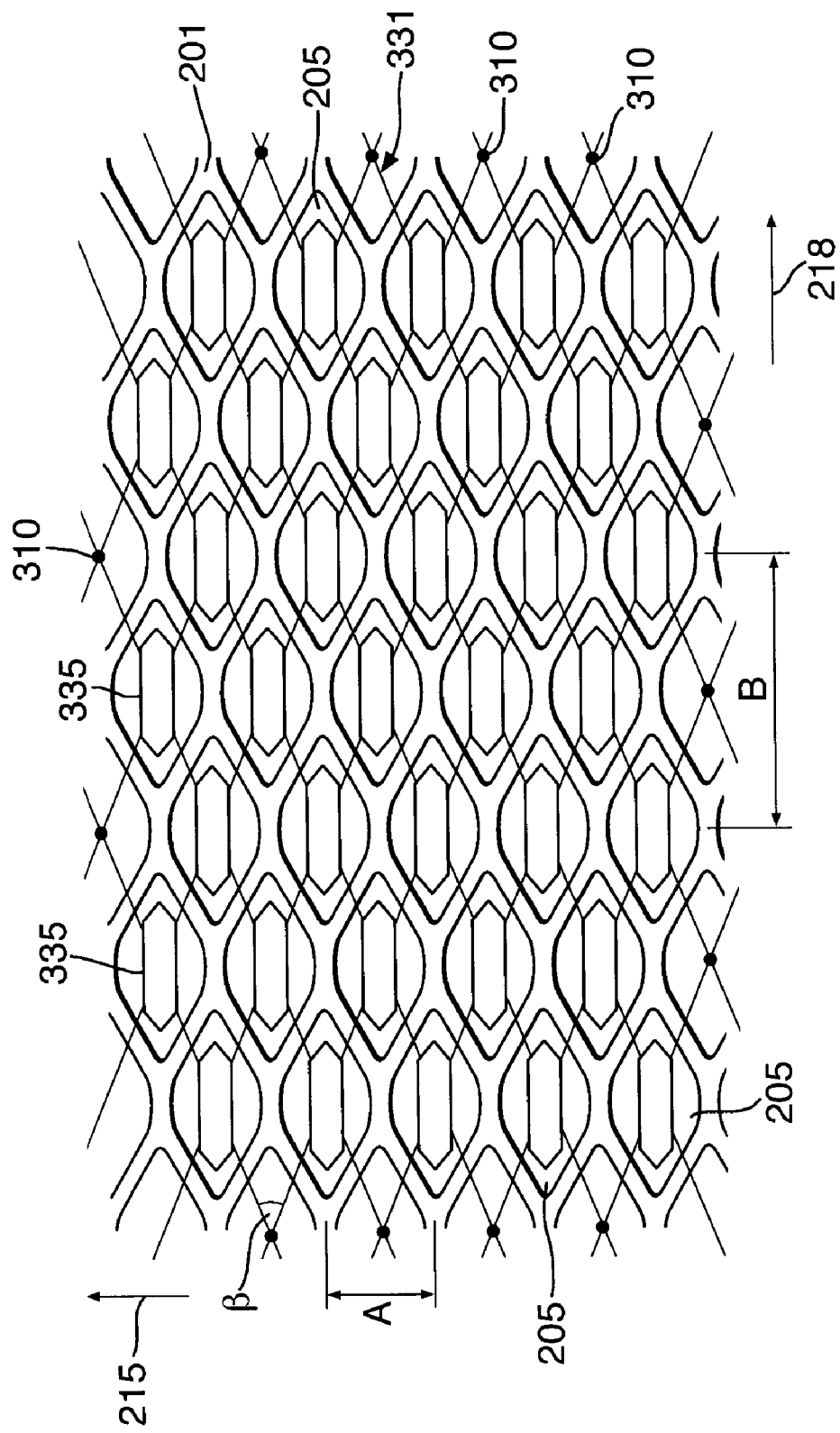
FIGS. 12 and 13 show schematically the beginning and end situations of a second embodiment of a method according to the invention for expanding pre-expanded metal to its final size.
Figure 13:
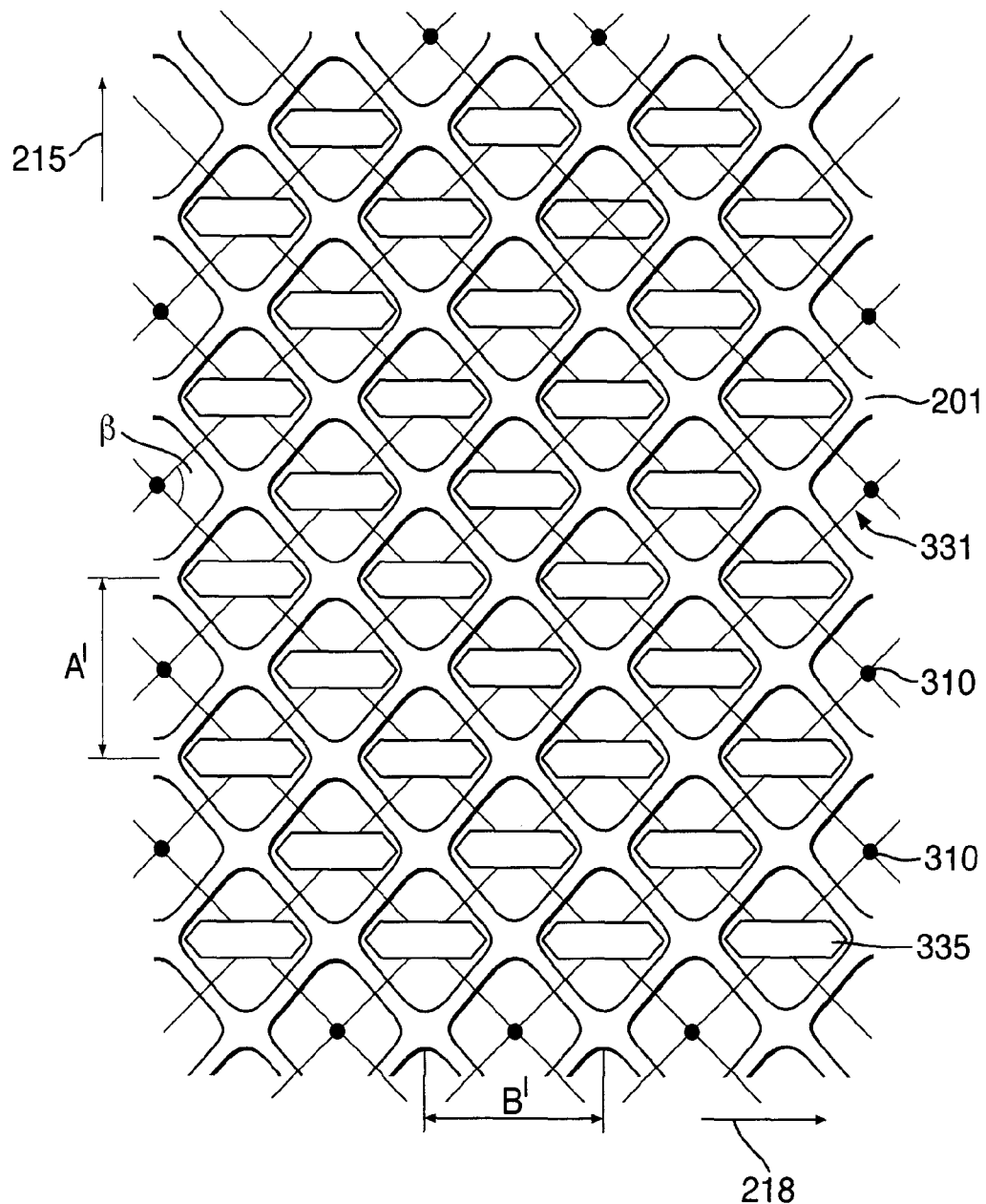

Reference is made to FIGS. 12 and 13. FIG. 12 shows again (part of) a conventional sheet of expanded metal 201 as already discussed with reference to FIG. 9. Visible through the openings 205 of the sheet 201 is a tool 331 that is similar to the tool 301 of FIG. 11, and of which similar parts are indicated with the same reference numerals. The grid formed by the tool 331 is chosen such that it matches the grid formed by the pre-expanded metal, when the tool angle $\beta$ corresponds to the stretching angle.

In each opening of the sheet 201a force transmitter 335 is arranged, on top of a joint 310 of the tool 331. The joints 310 are only indicated in this drawing at the circumference where no force transmitters are present. The force transmitters are all of the same size and shape, each being elongated with tapered ends extending towards the notch-like corner points of the openings in the pre-expanded metal. When the tool is hinged so as to increase the tool angle, the force transmitters engage the strands of the pre-expanded metal so that it is expanded in the direction 215 and at the same time contracted in the direction 218.

The final situation is shown in FIG. 13. In this embodiment the length of the force transmitters in the direction of their elongation determines the final width of the openings between notch-like corner points, i.e. in the direction 218. At the same time the maximum tool angle that can be obtained at the expansion step is determined by this length, so the desired size of openings is obtained by increasing the tool angle to the maximum. The length of the force transmitters 335 in the direction 218 is in this example chosen such, taking account of parameters of the expanded metal such as strand length and bond thickness, that the final expanded metal has the desired ratio of repetition lengths, in this example equal repetition lengths A', B' along the stretching direction 215 and the perpendicular direction 218, respectively.

Suitably it is arranged that the force transmitters remain oriented with their elongation direction perpendicular to the stretching direction during expansion. This can for example be achieved by arranging rails some distance out of the plane of the expanded metal, in which rails the force transmitters by their shape (or the joints to which they are connected) can slide during expansion thereby keeping their orientation.

That which is claimed is:

1. A method of manufacturing expanded metal forming a grid of openings and having a first repetition length in a first direction and a second repetition length in a second direction perpendicular to the first direction, such that the first and second repetition lengths have a predetermined ratio, which method comprises the steps of
    providing pre-expanded metal having a stretching direction coinciding with the first direction, and forming a grid having a ratio of first and second repetition lengths that is smaller than the predetermined ratio; and
    applying expansion force along the first direction, at a plurality of points at various positions with respect to the second direction, until the predetermined ratio of repetition lengths is obtained, wherein the expansion force is applied using a plurality of force transmitters co-operating with the plurality of points, and wherein the force transmitters are arranged on a tool comprising a hingeable grid, wherein said hingeable grid comprises two sets of parallel members connected with joints having pivots which extend out of the plane of said hingeable grid and into each opening of said pre-expanded metal, said pivots being suitably shaped to serve as force transmitters.

2. The method according to claim 1, wherein said force transmitters have an elongated shape with tapered ends in the direction of the corner points of said pre-expanded metal.

3. The method according to claim 1, wherein said method further comprises the steps of
    bringing said tool into a first configuration having a first angle;
    engaging said tool with the pre-expanded metal; and
    moving said tool into a second configuration having a second tool angle, thereby applying expansion force to the expanded metal.

4. The method according to claim 3, wherein the force transmitters have a shape that determines the maximum tool angle when the tool is engaged with expanded metal.

5. The method according to claim 1, wherein the force transmitters slide in rails in order to keep their orientation during expansion.

* * * * *